US012786015B2

(12) United States Patent
Ruan et al.

(10) Patent No.: US 12,786,015 B2
(45) Date of Patent: Nov. 3, 2026

(54) WIRELESS COMMUNICATION METHOD AND APPARATUS

(71) Applicant: HUAWEI TECHNOLOGIES CO., LTD., Shenzhen (CN)

(72) Inventors: Wei Ruan, Shanghai (CN); Yanjie Gu, Shenzhen (CN); Tianyu Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 474 days.

(21) Appl. No.: 18/187,061

(22) Filed: Mar. 21, 2023

(65) Prior Publication Data

US 2023/0224190 A1 Jul. 13, 2023

Related U.S. Application Data

(63) Continuation of application No. PCT/CN2020/116831, filed on Sep. 22, 2020.

(51) Int. Cl.

*H04W 12/03* (2021.01)
*H04B 7/0452* (2017.01)

(Continued)

(52) U.S. Cl.

CPC ....... *H04L 25/0242* (2013.01); *H04B 7/0452* (2013.01); *H04L 25/0204* (2013.01)

(58) Field of Classification Search

CPC ............. H04L 25/0242; H04L 25/0204; H04L 63/162; H04L 25/0248; H04B 7/0452;

(Continued)

(56) References Cited

U.S. PATENT DOCUMENTS

| | | | |
|---|---|---|---|
| 8,472,542 | B1 | 6/2013 | Wang et al. |
| 2012/0114024 | A1 | 5/2012 | Mielczarek et al. |

(Continued)

FOREIGN PATENT DOCUMENTS

| | | | |
|---|---|---|---|
| CN | 102546513 | A | 7/2012 |
| CN | 103475396 | A | 12/2013 |

(Continued)

OTHER PUBLICATIONS

IEEE Std 802.11b-1999/Cor 1-2001 (Corrigendum to IEEE Std 802.11b-1999), IEEE Standard for Information technology Telecommunications and information exchange between systems Local and metropolitan area networks Specific requirements Part 11: Wireless LAN Medium Access Control(MAC) and Physical Layer (PHY) specifications Amendment 2: Higher-speed Physical Layer (PHY)extension in the 2.4 GHz band Corrigendum 1,Nov. 7, 2001, total 96 pages.

(Continued)

*Primary Examiner* — Nicholas A Jensen
*Assistant Examiner* — Yonghong Zhao

(57) ABSTRACT

A wireless communication method and apparatus are disclosure. The communication method includes: A sending device obtains a first matrix, where the first matrix is generated based on channel estimation of a communication channel between the sending device and a signal receiving device; the sending device generates an interference signal based on interference information and a second matrix, where the second matrix is an orthogonal matrix of the first matrix; and the sending device superimposes the interference signal and a to-be-sent signal to generate a superimposed signal, and sends the superimposed signal to the receiving device.

17 Claims, 10 Drawing Sheets

(51) Int. Cl.
*H04B 7/0456* (2017.01)
*H04L 25/02* (2006.01)
*H04W 84/12* (2009.01)

(58) Field of Classification Search
CPC ................ H04B 7/0456; H04B 7/0617; H04K 2203/16; H04K 2203/18; H04K 2203/36; H04K 3/825; H04W 12/03; H04W 84/12
See application file for complete search history.

(56) References Cited

U.S. PATENT DOCUMENTS

| | | | | |
|---|---|---|---|---|
| 2012/0214404 | A1* | 8/2012 | Shany .................... | H04K 3/827 455/1 |
| 2014/0307838 | A1* | 10/2014 | Sagae .................. | H04B 7/0854 375/346 |
| 2015/0036821 | A1* | 2/2015 | Alex ................... | H04W 12/037 375/295 |
| 2017/0250962 | A1 | 8/2017 | Song et al. | |
| 2017/0373745 | A1* | 12/2017 | Park ..................... | H04B 7/0478 |
| 2020/0204287 | A1 | 6/2020 | Sethi et al. | |
| 2023/0179462 | A1* | 6/2023 | Shattil ................. | H04L 27/2634 375/295 |

FOREIGN PATENT DOCUMENTS

| | | | |
|---|---|---|---|
| CN | 106301492 | A | 1/2017 |
| CN | 108683443 | A | 10/2018 |
| CN | 108738133 | A | 11/2018 |
| CN | 109714087 | A | 5/2019 |

OTHER PUBLICATIONS

IEEE Std 802.11n-2009, Part 11: Wireless LAN Medium Access Control (MAC) and Physical Layer (PHY) Specifications, Amendment 5: Enhancements for Higher Throughput, dated Sep. 11, 2009, total 536 pages.
802.11ac-2013, IEEE Standard for Information technology Telecommunications and information exchange between systems Local and metropolitan area networks Specific requirements, Part 11: Wireless LAN Medium Access Control (MAC) and Physical Layer (PHY) Specifications Amendment 4: Enhancements for Very High Throughput for Operation in Bands below 6 GHz, total 425 pages.
IEEE P802.11ax/D1.0,"Part 11: Wireless LAN Medium Access Control (MAC) and Physical Layer (PHY) Specifications". dated Nov. 2016, total 453 pages.
IEEE Std 802.11g-2003 (Amendment to IEEE Std 802.11, 1999 Edition (Reaff 2003), IEEE Standard for Information technology Telecommunications and information exchange between systems Local and metropolitan area networks Specific requirements Part 11: Wireless LAN Medium Access Control (MAC) and Physical Layer (PHY) specifications Amendment 4: Further Higher Data Rate Extension in the 2.4 GHz Band,Jun. 27, 2003, total 78 pages.
IEEE Std 802.11a-1999 (Supplement to IEEE Std 802.11-1999), Supplement to IEEE Standard for Information technology Telecommunications and information exchange between systems Local and metropolitan area networks Specific requirements Part 11: Wireless LAN Medium Access Control(MAC) and Physical Layer (PHY) specifications: High-speed Physical Layer in the 5 GHZ Band,Approved Sep. 16, 1999, total 91 pages.
International Search Report and Written Opinion issued in PCT/CN2020/116831, dated Jun. 18, 2021, 8 pages.
Chen Xiaoming et al:"A Survey on Multiple-Antenna Techniques for Physical Layer Security", IEEE Communications Surveys and Tutorials, vol. 19, No. 2, May 31, 2017 (May 31, 2017), pp. 1027-1053 XP011651829, total: 27 pages.
Extended European Search Report issued in EP20954367.7, dated Sep. 8, 2023, 7 pages.

* cited by examiner

WIRELESS COMMUNICATION METHOD AND APPARATUS

CROSS-REFERENCE TO RELATED APPLICATIONS

This application is a continuation of International Application No. PCT/CN2020/116831, filed on Sep. 22, 2020, the disclosure of which is hereby incorporated by reference in its entirety.

TECHNICAL FIELD

The present disclosure relates to the communication field, and in particular, to a wireless communication method and apparatus.

BACKGROUND

With the development of science and technology, wireless communication technologies such as Wi-Fi and cellular networks are improving rapidly. In addition, technologies such as a large-scale antenna technology and a beamforming (BF) technology are used in communication, so that a signal transmission rate between a signal transmitting device and a signal receiving device can be increasingly high. The BF technology is a signal preprocessing technology based on an antenna array. The signal transmitting device generates a directional beam by adjusting a weighting coefficient of each array element in the antenna array, so that the signal receiving device can obtain an obvious array gain.

With popularization of wireless communication technologies, to ensure information security, a to-be-sent signal usually needs to be encrypted. In a current encryption technology, physical layer encryption is usually performed on sent information. This method can only increase difficulty of restoring information by an eavesdropping device, but cannot prevent the eavesdropping device from eavesdropping a signal. The BF technology is used as an example. When the signal transmitting device directs an antenna main power lobe to the signal receiving device, a plurality of antenna side power lobes is usually generated, as shown in FIG. 1. FIG. 1 schematically shows an antenna main power lobe a and a plurality of antenna side power lobes b transmitted by the signal transmitting device in beamforming. A direction of the antenna main power lobe a points to the signal receiving device, and the plurality of antenna side power lobes b respectively points to directions different from the direction of the antenna main power lobe a. The antenna side power lobe b carries a signal the same as a signal of the antenna main power lobe a. As a result, when the signal transmitting device transmits a signal to the signal receiving device by using the BF, another device may listen and detect, by using the antenna side power lobe b, the signal transmitted by the signal transmitting device, and parse and crack a detected signal, to steal information. Therefore, in a scenario in which a signal is sent by using a wireless communication technology, how to improve security of a signal sent through an electromagnetic wave needs to be resolved.

SUMMARY

The present disclosure provides a wireless communication method and an apparatus, to reduce the risk of eavesdropping on an electromagnetic wave communication signal, so that security of the electromagnetic wave communication signal can be improved.

According to a first aspect, the present disclosure provides a wireless communication method. The wireless communication method includes: A sending device obtains a first matrix, where the first matrix is generated based on channel estimation of a communication channel between the sending device and a signal receiving device; the sending device generates an interference signal based on interference information and a second matrix, where the second matrix is an orthogonal matrix of the first matrix; and the sending device superimposes the interference signal and a to-be-sent signal, and sends a superimposed signal to the receiving device.

The first matrix may be, for example, a weighting matrix in the embodiment shown in FIG. 4, and the second matrix may be, for example, an encoding matrix in the embodiment shown in FIG. 4.

The interference information is encoded by using the second matrix to obtain the interference signal, the interference signal and the to-be-sent signal are summed, and the superimposed signal is sent to the receiving device, so that information demodulated by an eavesdropping device includes both wanted information and the interference information, and energy of the interference signal in the superimposed signal received by the receiving device is zero. Therefore, an objective of encrypting the to-be-sent signal can be achieved, and security of a to-be-sent wanted signal is improved.

In a possible implementation, that the sending device superimposes the interference signal and a to-be-sent signal includes: The sending device carries the interference signal and the to-be-sent signal in a data field in a frame format of a communication protocol. In this implementation, the to-be-sent signal includes a wanted signal, that is, wanted information that needs to be demodulated by the receiving device. The interference signal and the wanted signal are summed, so that the eavesdropping device cannot obtain wanted information through demodulation, thereby improving information security.

In a possible implementation, when the sending device communicates with the receiving device based on a Wi-Fi communication technology, that the sending device superimposes the interference signal and a to-be-sent signal includes: a field indicating signal detection, a field indicating to perform automatic gain control (AGC), a field indicating signal synchronization, a field indicating signal frequency offset estimation, a field indicating a signal length, a field indicating to perform channel estimation, a field indicating a frame format used for detection, a field indicating that configuration information is carried by a frame format, a field indicating to perform automatic gain control in a multiple-input multiple-output (MIMO) receiving process, a field indicating to perform MIMO channel estimation, or a field indicating resource allocation information of orthogonal frequency division multiple access (OFDMA) and multi-user MIMO. In this implementation, in addition to the wanted signal, the to-be-sent signal may further include a signal carried by any one of the foregoing fields. In addition to superimposing the interference signal and the wanted signal, the interference signal and another signal may also be summed, so that the eavesdropping device cannot parse and obtain configuration information such as bandwidth and MCS, and cannot obtain correct estimation of a MIMO channel. In this way, information security is further improved.

In a possible implementation, the first matrix is an orthogonal matrix, and the second matrix is a matrix constituted by at least one column of vectors selected from the first matrix.

In a possible implementation, the to-be-sent signal is generated based on a mapping result of the N subcarriers that is obtained by performing mapping to N subcarriers on information provided by a to-be-sent information source, where N is an integer greater than 1.

In a possible implementation, each of the N subcarriers corresponds to N channels between the sending device and the receiving device, the first matrix includes N first matrices, each of the N first matrices is generated by performing channel estimation on each of the N channels, and the second matrix includes N second matrices, where each second matrix is an orthogonal matrix of a corresponding first matrix.

In a possible implementation, that the sending device generates an interference signal based on interference information and a second matrix includes: The sending device performs the mapping to the N subcarriers on the interference information, to obtain signals after mapping to N subcarriers; and the sending device generates the interference signal based on the N second matrices and the signals after mapping to N subcarriers.

In a possible implementation, that the sending device superimposes the interference signal and the to-be-sent signal includes: The sending device separately superimposes an interference signal corresponding to each of the N subcarriers and the to-be-sent signal.

In a possible implementation, the first matrix is generated based on a channel estimation result that is obtained by performing channel estimation on a long training field in a received sounding response frame by the receiving device.

In a possible implementation, the first matrix is generated based on a channel estimation result that is obtained by estimating, by the sending device, a channel based on channel measurement information sent by the receiving device.

According to a second aspect, an embodiment of the present disclosure provides a wireless communication method. The wireless communication method includes: A receiving device receives a superimposed signal, where the superimposed signal is a signal obtained by superimposing an interference signal and a to-be-sent signal, the interference signal is generated based on interference information and a second matrix, the second matrix is an orthogonal matrix of a first matrix, and the first matrix is generated based on channel estimation of a communication channel between the receiving device and a sending device; and the receiving device demodulates the superimposed signal based on the first matrix, to obtain the to-be-sent signal.

The receiving device demodulates the superimposed signal by using the first matrix, so that energy of the interference signal approaches zero, and the to-be-sent signal can be correctly demodulated. In addition, because an eavesdropping device cannot obtain the first matrix, the eavesdropping device cannot obtain the to-be-sent signal through demodulation. This achieves an objective of information encryption and improves signal security.

According to a third aspect, an embodiment of the present disclosure provides a wireless communication apparatus, where the wireless communication apparatus includes: a processor, configured to: obtain a first matrix, generate an interference signal based on interference information and a second matrix, and superimpose the interference signal and a to-be-sent signal to obtain a superimposed signal, where the second matrix is an orthogonal matrix of the first matrix, and the first matrix is generated based on channel estimation of a communication channel between the communication apparatus and a receiving device; and a radio transmitter, coupled to the processor, and configured to send the superimposed signal to the receiving device.

In a possible implementation, the processor is further configured to carry the interference signal and the to-be-sent signal in a data field in a frame format of a communication protocol.

In a possible implementation, when the sending device communicates with the receiving device based on a Wi-Fi communication technology, the processor is further configured to carry the interference signal and the to-be-sent signal in a data field in a Wi-Fi frame format and at least one of the following fields: a field indicating signal detection, a field indicating to perform automatic gain control (AGC), a field indicating signal synchronization, a field indicating signal frequency offset estimation, a field indicating a signal length, a field indicating to perform channel estimation, a field indicating a frame format used for detection, a field indicating that configuration information is carried by a frame format, a field indicating to perform automatic gain control in a multiple-input multiple-output (MIMO) receiving process, a field indicating to perform MIMO channel estimation, or a field indicating resource allocation information of orthogonal frequency division multiple access (OFDMA) and multi-user MIMO.

In a possible implementation, the to-be-sent signal is generated based on a mapping result of the N subcarriers that is obtained by performing mapping to N subcarriers on information provided by a to-be-sent information source, where N is an integer greater than 1.

In a possible implementation, each of the N subcarriers corresponds to N channels between the sending device and the receiving device, the first matrix includes N first matrices, each of the N first matrices is generated by performing channel estimation on each of the N channels, and the second matrix includes N second matrices, where each second matrix is an orthogonal matrix of a corresponding first matrix.

In a possible implementation, the interference signal is generated based on the N second matrices and signals obtained by performing the mapping to the N subcarriers on the interference information.

In a possible implementation, the processor is further configured to separately superimpose an interference signal corresponding to each of the N subcarriers and the to-be-sent signal.

In a possible implementation, the first matrix is generated based on a channel estimation result that is obtained by performing channel estimation on a long training field in a received sounding response frame by the receiving device.

In a possible implementation, the first matrix is generated by the communication apparatus estimating a channel based on channel measurement information sent by the receiving device and based on a channel estimation result.

The processor according to the third aspect may be a baseband processor. In addition, the processor may alternatively be a system on chip (SOC), including the baseband processor and another processor. Further, when the processor is a baseband processor, the radio transmitter and the processor may also be disposed in a same SOC.

According to a fourth aspect, an embodiment of the present disclosure provides a communication apparatus. The communication apparatus includes: a radio frequency receiver, configured to receive a superimposed signal, where the superimposed signal is a signal obtained by superimposing an interference signal and a to-be-sent signal, the interference signal is generated based on interference information and a second matrix, the second matrix is an orthogonal matrix of a first matrix, and the first matrix is generated based on channel estimation of a communication channel between the communication apparatus and a transmitting device; and a processor, configured to demodulate the superimposed signal based on the first matrix, to obtain the to-be-sent signal.

According to a fourth aspect, an embodiment of the present disclosure provides a wireless communication apparatus, where the wireless communication apparatus includes a memory and at least one processor, the memory is configured to store a computer program, and the at least one processor is configured to invoke all or some of the computer programs stored in the memory, to perform the method according to the first aspect or the second aspect.

According to a fifth aspect, an embodiment of the present disclosure provides a computer-readable storage medium, where the computer-readable storage medium stores a computer program, and the computer program is used to implement the method according to the first aspect or the second aspect when the computer program is executed by at least one processor.

According to a sixth aspect, an embodiment of the present disclosure provides a computer program product. The computer program product is configured to implement the method according to the first aspect or the second aspect when the computer program product is executed by at least one processor.

It should be understood that, the technical solutions in the second aspect to the sixth aspect of the present disclosure are consistent with the technical solution in the first aspect. Beneficial effects achieved in the various aspects and corresponding feasible implementations are similar.

DESCRIPTION OF EMBODIMENTS

Figure 1:
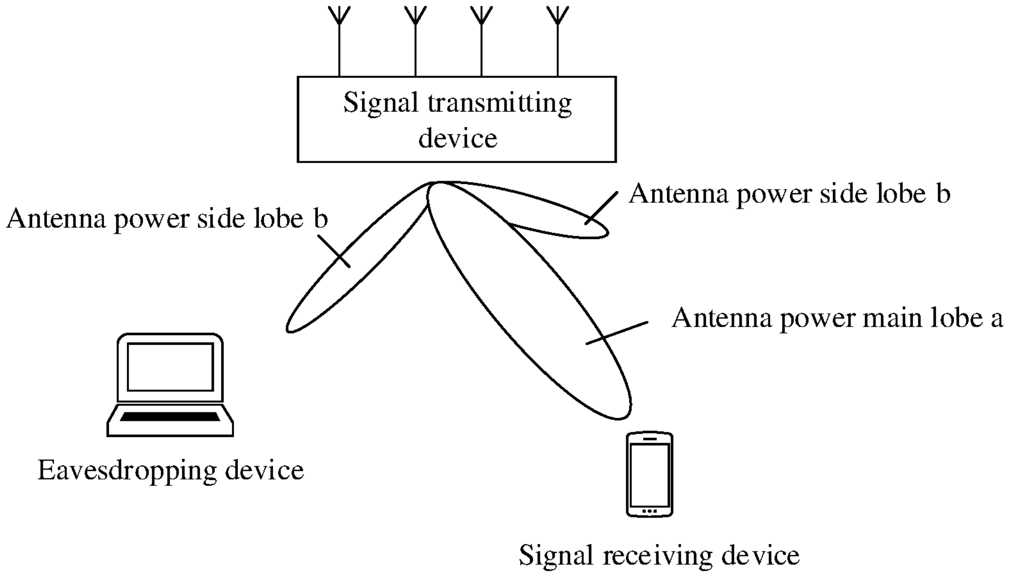
FIG. 1 is a diagram of a scenario in which a BF technology is used to send a signal in a conventional technology.

The following describes technical solutions of the present disclosure with reference to accompanying drawings.

Embodiments of the present disclosure may be applied to a short-range communication scenario. The short-range communication may include but is not limited to Wi-Fi communication, Bluetooth communication, and the like. In addition, embodiments of the present disclosure may be further applied to a cellular communication scenario. In the embodiments of the present disclosure, a signal transmitting device (which may also be referred to as a sending device) configured to transmit a signal may be a terminal device, or may be a network device communicating with a terminal device; and a signal receiving device (which may also be referred to as a receiving device) configured to receive a signal from the signal transmitting device may be a network device, or may be a terminal device. In addition, the wireless communication method shown in the embodiments of the present disclosure may be performed by a terminal device or a network device.

The terminal device may also be referred to as: a subscriber station (STA), user equipment (UE), a mobile station (MS), a mobile terminal ( ) an access terminal, a subscriber unit, a subscriber station, a mobile station, a mobile console, a remote station, a remote terminal, a mobile device, a user terminal, a terminal, a wireless communication device, a user agent, a user apparatus, or the like. For example, the terminal device may be a handheld device or a vehicle-mounted device having a wireless connection function. Currently, examples of some terminals are: a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, or the like. This is not limited in embodiments of the present disclosure.

The network device may be a device configured to communicate with a terminal device, and may be a wireless controller in a cloud radio access network (CRAN) scenario. Alternatively, the radio access device may be a relay station, an access point, a vehicle-mounted device, or the like, and may be a Wi-Fi access point (AP). This is not limited in this embodiment. In addition, the network device may alternatively be a device in a RAN (Radio Access Network), or in other words, a RAN node that connects the terminal device to a wireless network. For example, by way of example but not limitation, as a network device, the following may be listed: a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU) or the like.

Figure 2:
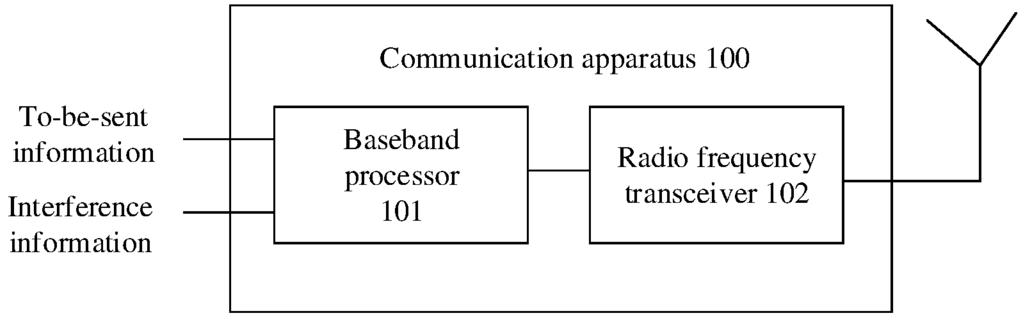
FIG. 2 is a schematic diagram of a hardware structure of a communication apparatus according to an embodiment of the present disclosure.

FIG. 2 is a schematic diagram of a hardware structure of a communication apparatus 100 according to an embodiment of the present disclosure. The communication apparatus 100 described in this embodiment may be a communication apparatus in a short-range communication scenario such as Wi-Fi, or may be used as a communication apparatus in a cellular network communication scenario such as 3G, 4G, or 5G. The communication apparatus 100 may be specifically a chip, a chip set, a circuit board provided with a chip or a chip set, or an electronic device including the circuit board (for example, the terminal device or the network device described above). The chip or chip set or the circuit board provided with the chip or chip set may work under a necessary software driver. Subsequent embodiments are described by using an example in which the communication apparatus 100 is an electronic device, but are not intended to limit a solution. The communication apparatus 100 shown in FIG. 2 includes one or more processors, for example, a baseband processor 101 and another processor. The one or more processors may be integrated in one or more chips, and the one or more chips may be considered as one chip set. When one or more processors are integrated in a same chip, the chip is also called a system on chip (SOC). In a possible implementation, the baseband processor 101 and a radio transmitter 102 may be integrated on a same chip, that is, integrated on an SOC. In addition, in another implementation, the baseband processor 101 may be integrated on one chip, and a radio transmitter 102 may be integrated on another chip. An electronic apparatus shown in FIG. 2 is applied to a signal transmitting device.

Figure 3:
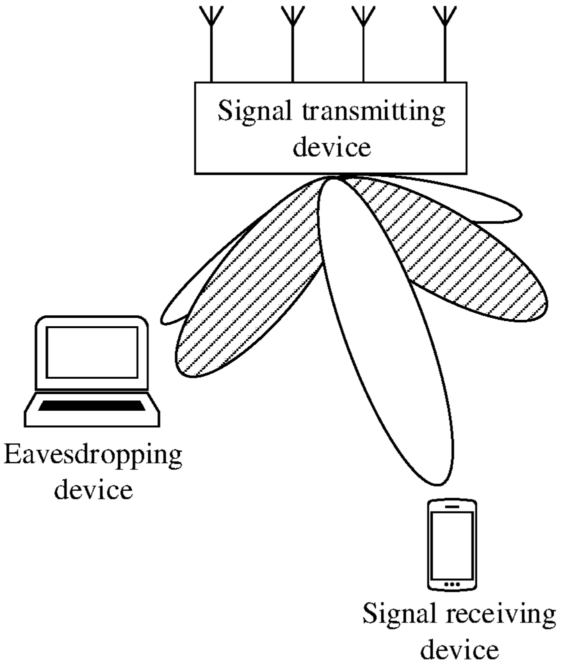
FIG. 3 is a schematic diagram of an application scenario according to an embodiment of the present disclosure.

The baseband processor 101 is configured to process to-be-sent information and interference information, generate a baseband signal, and send the baseband signal to the radio transmitter 102. The radio transmitter 102 performs frequency conversion processing on the received baseband signal to form a radio frequency signal. Then, the radio transmitter transmits the radio frequency signal to a signal receiving device by using one or more antennas. It should be noted that the to-be-sent information herein may also be referred to as wanted information, that is, information that a sending device expects a signal receiving device to receive. The to-be-sent information is usually information obtained from an information source. The information source may include but is not limited to, for example, other user equipment or a server device or the like. The wanted information may include but is not limited to, for example, image information, audio information, or text information. It should be noted that the to-be-sent information is uniformly referred to as wanted information below. The interference information is information that causes interference to information received by using an antenna side power lobe b shown in FIG. 1. The interference information may include but is not limited to a random number and the like. The baseband processor processes the to-be-sent information and the interference information, so that energy of an interference signal received by the signal receiving device approaches zero. That is, a signal received by the signal receiving device includes only a wanted signal, and energy of an interference signal received by another device such as an eavesdropping device is not zero. That is, a signal received by the eavesdropping device is a superposition of the wanted signal and the interference signal. The interference signal is used to interfere the wanted signal, so that it is difficult for the eavesdropping device to obtain the wanted signal by parsing. In this way, security of a sent wanted signal is improved. FIG. 3 is a schematic diagram of a signal carried in a beam transmitted by a signal transmitting device according to an embodiment of the present disclosure. In FIG. 3, a signal carried by a blank beam is a wanted signal, and a signal carried by a beam with shadow stripes is an interference signal.

Figure 4:
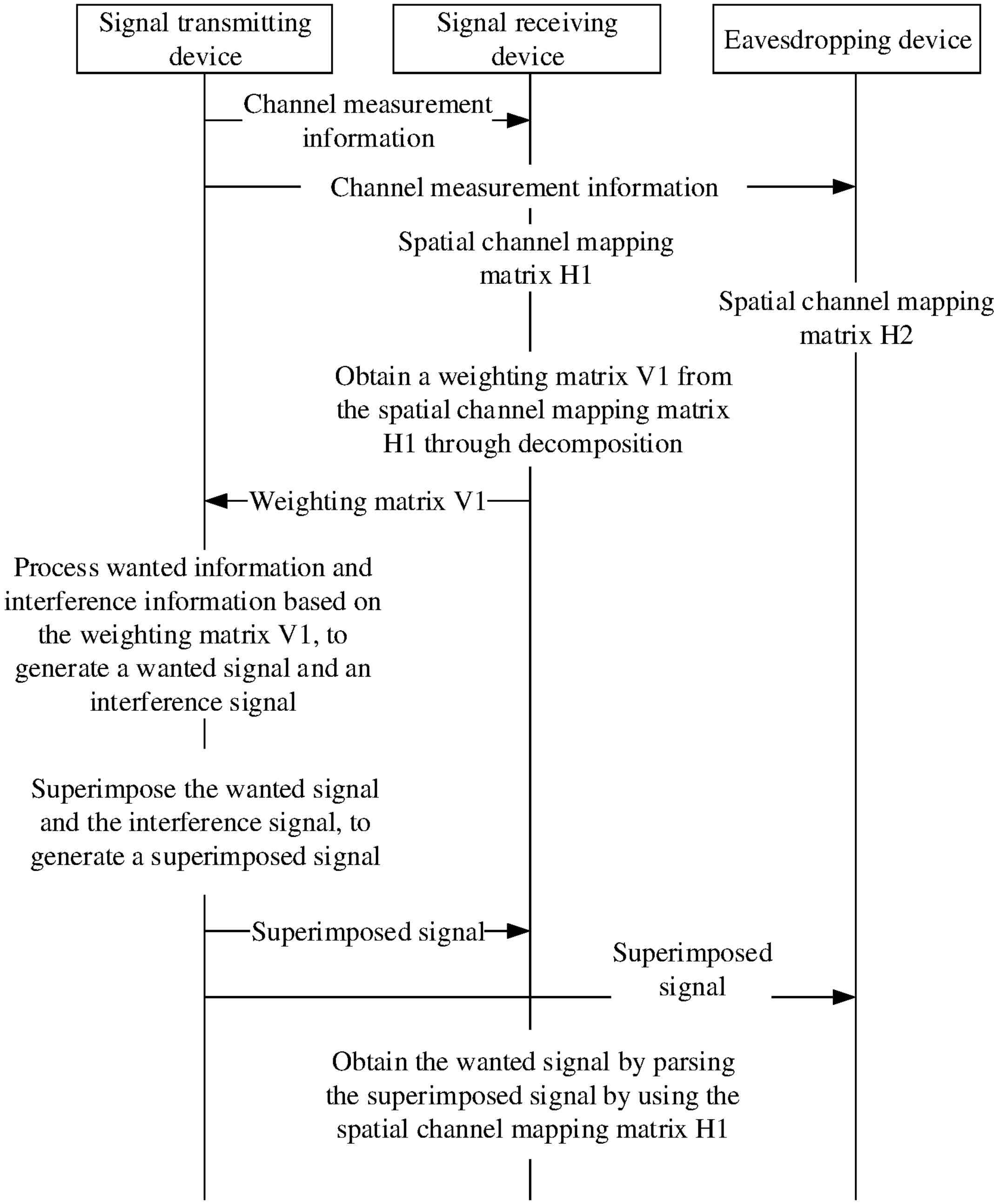
FIG. 4 is a flowchart of signal interaction between a signal transmitting device, a signal receiving device, and an eavesdropping device according to an embodiment of the present disclosure.

Generally, a signal needs to be modulated onto a communication channel for transmission. A same signal transmitting device communicates with different signal receiving devices on different communication channels. The communication channel may be generated by the signal receiving device performing channel estimation based on information that is sent by the signal transmitting device and that is used to indicate channel measurement; or the communication channel may be generated by the signal transmitting device performing channel estimation based on received information from the signal receiving device. The communication channel may be embodied by a spatial channel mapping matrix. The signal received by the signal receiving device is usually a product of the spatial channel mapping matrix and a to-be-sent signal. Further, when the signal transmitting device needs to simultaneously send, to the signal receiving device, information provided by a plurality of information sources, baseband processing and up-conversion processing may be performed on the information provided by the plurality of information sources, and then the information is sent to the signal receiving device. In this case, a signal received by the signal receiving device is a superposition of a plurality of signals, and each of the signals is a product of information provided by each information source and a same spatial channel mapping matrix. For example, FIG. 4 schematically shows signal interaction between the signal transmitting device, the signal receiving device, and the eavesdropping device shown in FIG. 3.

In a communication scenario having a beamforming technology shown in FIG. 3, the signal transmitting device broadcasts channel measurement information based on a preset period. When the communication scenario is a communication scenario based on Wi-Fi, the signal transmitting device and the signal receiving device estimate a channel based on detected channel measurement information, and respectively generates a spatial channel mapping matrix $H_1$ and a spatial channel mapping matrix $H_2$ based on channel estimation result. The signal receiving device may further decompose the spatial channel mapping matrix $H_1$ to generate a weighting matrix $V_1$, and sends the weighting matrix $V_1$ to the signal transmitting device. When the communication scenario is a communication scenario based on a cellular network, the signal receiving device may estimate a channel based on detected channel measurement information, and send a number corresponding to channel state information to the signal transmitting device based on a channel estimation result. The signal transmitting device may determine the channel state information of the signal receiving device based on the received number of the channel state information, generate a spatial channel mapping matrix based on the channel state information, and finally decompose the spatial channel mapping matrix to generate a weighting matrix. In subsequent descriptions of embodiments of the present disclosure, a communication scenario based on Wi-Fi is used for description. The baseband processor in the signal transmitting device processes wanted information provided by an information source based on the weighting matrix $V_1$, to generate a wanted signal $S_1$, and processes interference information, to generate an interference signal $S_2$. Then, the baseband processor superimposes the wanted signal $S_1$ and the interference signal $S_2$ to generate a superimposed signal and provides the superimposed signal to the radio transmitter. The radio transmitter performs up-conversion processing on the superimposed signal and transmits the signal through an antenna. In this case, the signal receiving device may receive the superimposed signal by using an antenna main power lobe shown in FIG. 3, and the eavesdropping device may receive the superimposed signal by using an antenna side power lobe shown in FIG. 3. Specifically, a signal R1 received by the signal receiving device is:

$$R_1=H_1S_1+H_1S_2 \quad (1); \text{ and}$$

a signal R2 received by the eavesdropping device is:

$$R_2=H_2S_1+H_2S_2 \quad (2).$$

It can be learned from Formula (1) and Formula (2) that, provided that the interference information is processed so that a product of the interference signal $S_2$ and the spatial channel mapping matrix $H_1$ is 0, energy of the interference signal in the signal received by the signal receiving device approaches 0. However, a spatial channel mapping matrix between the eavesdropping device and the signal receiving device is different. In this case, a product of the interference signal and the spatial channel mapping matrix $H_2$ is not zero, that is, a signal received by the eavesdropping device includes a superposition of the interference signal and the wanted signal. In this way, an objective of encrypting a signal transmitted to the signal receiving device is achieved. In specific implementation, the spatial channel mapping matrix $H_1$ may be decomposed, a matrix orthogonal to the spatial channel mapping matrix $H_1$ is determined based on a decomposition result, and interference information is processed by using the matrix orthogonal to the spatial channel mapping matrix $H_1$, so that the interference signal obtained after processing the interference information includes the matrix orthogonal to the spatial channel mapping matrix $H_1$, and energy of the interference signal in the signal received by the signal receiving device approaches 0. The signal received by the eavesdropping device includes the superposition of the interference signal and the wanted signal, so that the signal transmitted to the signal receiving device can be encrypted, to improve security of the signal transmitted to the signal receiving device.

The following uses a communication scenario having a beamforming function shown in FIG. 3 as an example to describe in detail, a manner of determining the matrix orthogonal to the spatial channel mapping matrix $H_1$ in this embodiment, based on communication interaction between devices shown in FIG. 4.

Specifically, a signal transmitting device transmits a sounding frame to a signal receiving device. The Sounding frame includes a long training field (LTF). The signal receiving device may estimate a channel by using information carried in the LTF field, and generate the spatial channel mapping matrix $H_1$ based on a channel estimation result. Then, the signal transmitting device performs singular value decomposition (SVD) on the spatial channel mapping matrix $H_1$ to obtain the weighting matrix $V_1$, as shown in formula (3).

$$H_1 = UMV_1; \quad (3)$$

In another possible implementation of this embodiment, the signal transmitting device may alternatively perform a plurality of QR iterations on the spatial channel mapping matrix $H_1$, to obtain the weighting matrix $V_1$ based on an iteration result.

It is assumed that the spatial channel mapping matrix $H_1$ is a (m rows×n columns) matrix. Among matrices obtained by decomposing the spatial channel mapping matrix $H_1$, a matrix U is a (m rows×m columns) unitary matrix, a matrix Mis a (m rows×n columns) diagonal matrix, and the weighting matrix $V_1$ is a (n rows×n columns) unitary matrix.

In this embodiment, null space of the weighting matrix $V_1$ is solved, that is, a specific encoding matrix W is solved, so that a product of the encoding matrix W and the weighting matrix $V_1$ is zero. Then, a baseband processor may process the interference information by using the encoding matrix W, so that a product constraint relationship exists between the encoding matrix W and the interference information, and a generated interference signal may be W $S_2$ based on a processing result. In specific implementation, a product operation may be performed on the encoding matrix W and the interference information. In this case, a signal received by the signal receiving device is:

$$R_1=H_1S_1+H_1S_2=H_1S_1+UMV_1WS_2=H_1S_1 \quad (4); \text{ and}$$

a signal received by the eavesdropping device is:

$$R_2 = H_2S_1 + H_2S_2 = H_2S_1 + H_2W\ S_2. \quad (5)$$

In the communication scenario having the beamforming function shown in FIG. 3, the weighting matrix $V_1$ is a unitary matrix, that is, any two columns of vectors in the weighting matrix $V_1$ are orthogonal. Based on this, in a possible implementation of this embodiment, a matrix constituted by selecting any one or more columns of vectors in the weighting matrix $V_1$ is the foregoing encoding matrix W.

In addition, in some other possible implementations, an orthogonal matrix of the weighting matrix $V_1$ may be solved by solving an orthogonal matrix, to determine an encoding matrix W. In this implementation, any column vector in the obtained encoding matrix W is different from any column vector in the weighting matrix $V_1$.

Figure 5:
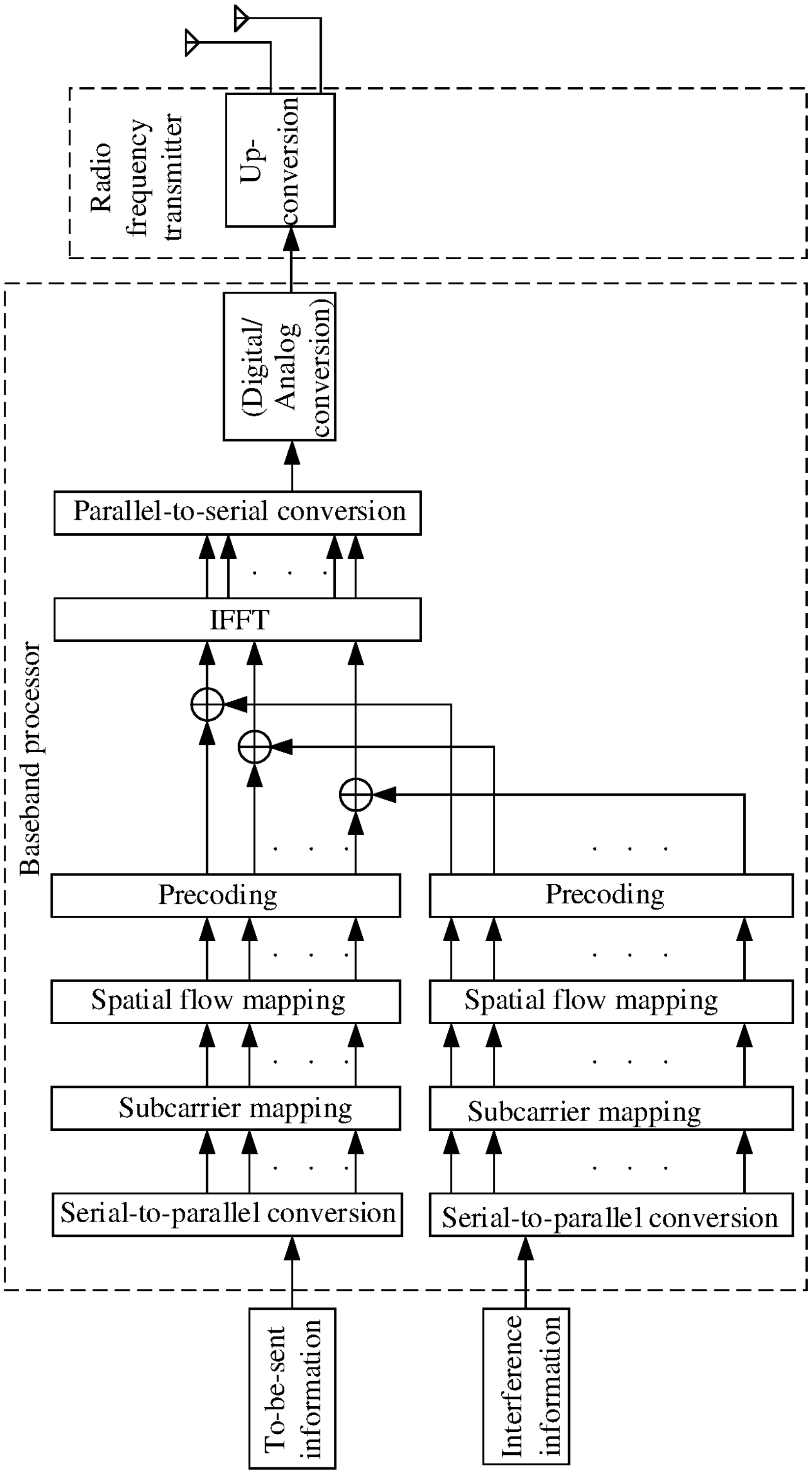
FIG. 5 is a flowchart of performing OFDM modulation on wanted information and interference information according to an embodiment of the present disclosure.

Based on the communication scenario having the beamforming function shown in FIG. 3, in this embodiment, wanted information and interference information may be modulated by using an orthogonal frequency division Multiplexing (OFDM) technology, a wanted signal and an interference signal are separately generated based on a modulation result, and then the wanted signal and the interference signal are summed. After inverse fast Fourier transform (IFFT) and parallel-to-serial conversion of the superimposed signal, a digital signal is converted into an analog signal, and the analog signal is sent to a radio transmitter. The radio transmitter performs up-conversion processing on a signal, and transmits the signal obtained through up-conversion processing through an antenna. Specifically, FIG. 5 is a flowchart of OFDM modulation performed by a baseband processor on wanted information and interference information according to an embodiment of the present disclosure. The following separately describes the OFDM modulation performed on the wanted information and the interference information in detail.

In this embodiment, it is assumed that information is modulated by using N subcarriers. The baseband processor performs serial-to-parallel conversion processing on the wanted information sent by an information source, to generate N channels of wanted information. Then, the N channels of wanted information is respectively mapped to preset N subcarriers by using a subcarrier mapping technology. Then, spatial flow mapping is separately performed on the N channels of wanted information obtained after subcarrier mapping is performed, to generate wanted information obtained after spatial flow mapping is performed. Finally, precoding processing is performed on the wanted information obtained after spatial flow mapping is performed, to generate N wanted signals. Precoding processing is performed on a wanted signal, so that a power transmit beam with maximum direction can be obtained. For a process of precoding processing on the wanted signal, refer to related precoding processing on a signal in a conventional OFDM modulation technology.

The baseband processor performs serial-to-parallel conversion processing on the interference information, to generate N channels of interference information. Then, the N channels of interference information are respectively mapped to N subcarriers in one-to-one correspondence by using the subcarrier mapping technology. The N subcarriers to which the N channels of interference information are mapped are the same as the N subcarriers to which the N channels of wanted information are mapped. Then, spatial flow mapping is performed on the N channels of interference information obtained after subcarrier mapping is performed, to generate interference information obtained after spatial flow mapping is performed. Finally, precoding processing is separately performed on each channel of interference information obtained after spatial flow mapping is performed, to generate N interference signals.

In the OFDM technology, a signal transmitting device needs to transmit, to a signal receiving device, measurement information used to indicate to perform channel measurement on channels corresponding to a plurality of subcarriers. The signal receiving device needs to measure the channels corresponding to the plurality of subcarriers, generate, based on a measurement result, a channel matrix of a channel corresponding to each channel of subcarrier, and then perform singular value decomposition on the channel matrix of the channel corresponding to each subcarrier by using the foregoing formula (3), to obtain a weighting matrix corresponding to each subcarrier. The signal receiving device sends the weighting matrix corresponding to each subcarrier to the signal transmitting device. The baseband processor in the signal transmitting device may separately generate, an encoding matrix W corresponding to each subcarrier based on the weighting matrix corresponding to each subcarrier, to encode each channel of interference information after mapping to the plurality of subcarriers, and generate the N interference signals based on an encoding result. Then, the wanted signal and the interference signal corresponding to each channel of subcarrier are summed, and after parallel-to-serial conversion is performed on a plurality of subcarrier signals obtained after superposition, a digital signal is converted into an analog signal, and the analog signal is provided to a radio transmitter.

In this embodiment, a quantity of spatial flows of the superimposed signal is determined based on spatial flow mapping on the wanted signal. In addition, a quantity of spatial flows used to transmit a signal meets the following constraint conditions: the quantity of spatial flows used to transmit the signal is equal to a quantity of column vectors selected from the weighting matrix, and a quantity of spatial flows of the interference signal is equal to a quantity of vectors in the encoding matrix W used to encode the interference signal. Based on this, it is assumed that the weighting matrix is a matrix whose dimension is 3 rows×3 columns. In other words, a maximum of three spatial flows may be used to transmit a signal. The baseband processor performs, based on a quantity of transmitting antenna arrays and a quantity of receiving antenna arrays, spatial flow mapping on the wanted signal after mapping to a plurality of subcarriers, and determines to transmit the wanted signal through two spatial flows, that is, corresponds to two columns of vectors selected from the foregoing weighting matrix. In this case, a column of vectors may be determined as the encoding matrix W used to encode the interference signal, and the determined column of vectors is vectors orthogonal to the weighting matrix. It is assumed that the wanted signal is transmitted through one spatial flow, that is, corresponds to a column of vectors selected from the foregoing weighting matrix. In this case, two columns of vectors may be determined as the encoding matrix W used to encode the interference signal, and the determined two columns of vectors are vectors orthogonal to the weighting matrix.

The embodiments shown in FIG. 3 to FIG. 5 are described by using a wireless communication scenario that supports a beamforming technology. The manner of encrypting an electronic device by using an interference signal described in this embodiment is also applicable to a Wi-Fi wireless communication scenario that does not support the beamforming technology. In the Wi-Fi wireless communication scenario that does not support the beamforming technology, the signal receiving device may transmit a sounding request frame to the signal transmitting device. The signal transmitting device determines a weighting matrix of the signal receiving device based on the sounding request frame by using a (Legacy Transmit Beamforming, Legacy TxBF) algorithm. Specifically, the signal transmitting device estimates an uplink channel based on the sounding request frame transmitted by the signal receiving device, and obtains an approximate downlink channel matrix based on an uplink channel estimation result and a theoretical transpose relationship between uplink and downlink channels. Then, the signal transmitting device may perform singular value decomposition on the determined downlink channel matrix by using formula (3), and determine a weighting matrix based on a decomposition result. Then, the encoding matrix W orthogonal to the weighting matrix is determined based on the weighting matrix, interference information is processed by using the encoding matrix W, to generate an interference signal, and the interference signal and the wanted signal are summed, and then transmitted through an antenna.

In this embodiment, wanted information obtained from an information source needs to be packaged and encapsulated in a frame format for transmission. The frame format is usually a frame format pre-agreed on between a signal transmitting device and a signal receiving device. The wanted data (including but not limited to audio data, video data, or text data) obtained from the information source is generally carried by a data field in each of the frame format. The frame format may include but is not limited to a frame format in a Wi-Fi communication protocol, a frame format in a 4G communication protocol, or a frame format in a 5G communication protocol. The wanted signal described in this embodiment may include a signal carried by a data field in various frame formats in a communication protocol. In addition, in some other possible implementations, in addition to the signal carried by the data field in the various frame formats in the communication protocol, the wanted signal may further include a signal carried by at least one field in a preamble field in a frame format. That is, when the interference signal and the wanted signal are summed, the interference signal and the signal carried by the data field in the frame format may be summed. In addition, the interference signal and the signal carried by the at least one field in the preamble field in the frame format may be further summed. The following uses the frame format in the Wi-Fi communication protocol as an example to describe in detail, by using a specific scenario, a wanted signal summed by the interference signal shown in this embodiment.

Specifically, a frame format in an 802.11 ax protocol in a Wi-Fi protocol includes but is not limited to a high efficiency (HE) frame format, a very high throughput (VHT) frame format, a high throughput (HT) frame format, or a non-high throughput (Non-HT) frame format. The HE frame format may further include a high efficiency single user (HE-SU) frame format, a high efficiency extend range single user (HE-ERSU) frame format, a high efficiency multi user (HE-MU) frame format, and a high efficiency extend trigger frame (HE-TB) frame format.

Figure 6:
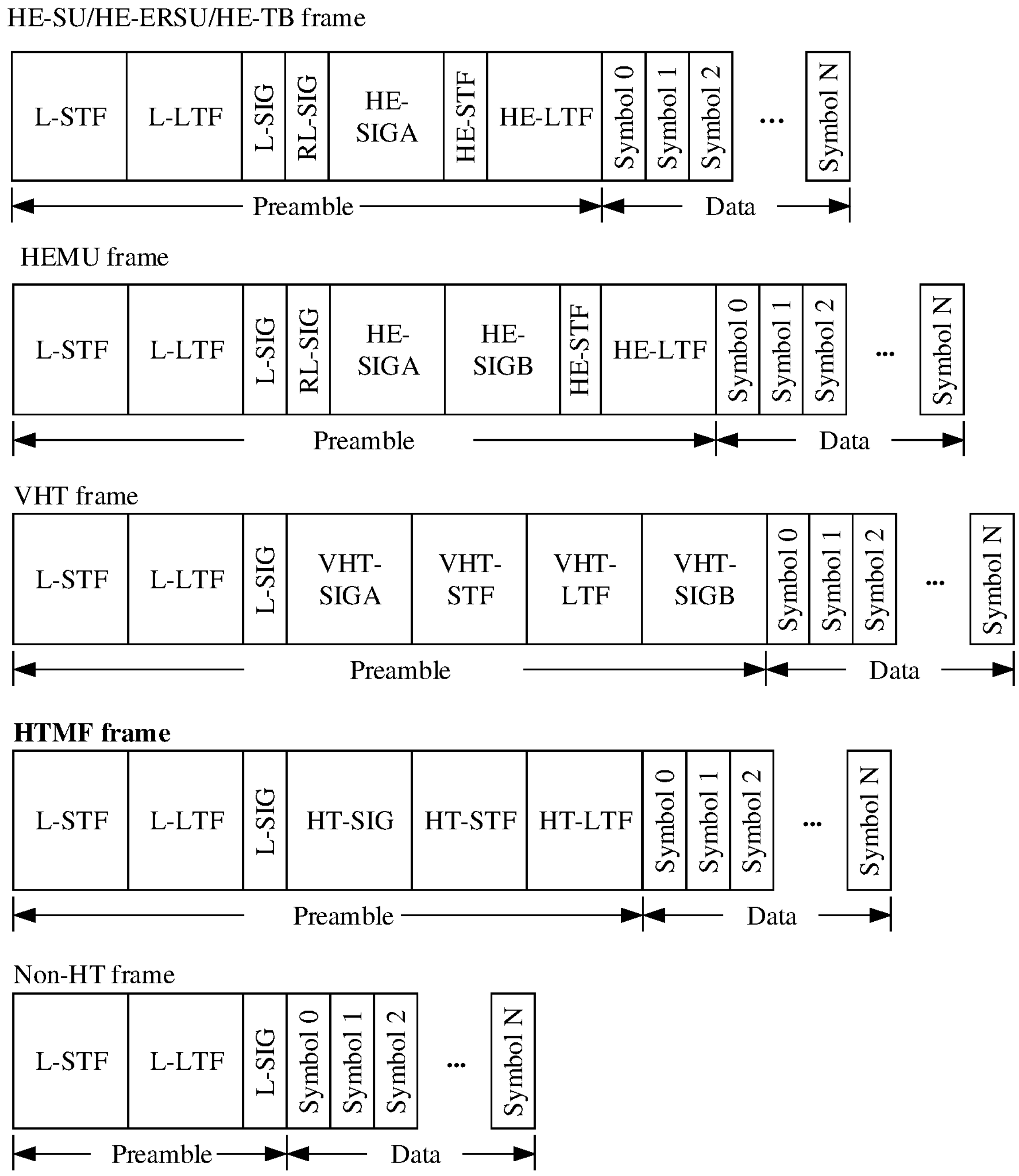
FIG. 6 is a frame format in a Wi-Fi protocol according to an embodiment of the present disclosure.

In the various frame formats, in addition to the Data field used to carry wanted data, the frame formats further include a preamble field. The Preamble field further includes a plurality of fields used to indicate various information. Each information indicated by the preamble field in different frame formats is not completely the same. For example, FIG. 6 schematically shows information indicated by each field in an HE-SU or HE-ERSU frame format, an HE-TB frame format, an HE-MU frame format, a VHT frame format, an HTMF frame format, and a Non-HT frame format.

A Preamble field in the Non-HT frame format includes: a legacy short training sequence/non-high throughput frame format short training sequence (non-HT Short Training field, L-STF) field, a legacy long training sequence/non-high throughput frame format long training sequence (non-HT Long Training field, L-LTF) field, and a legacy signal/non-high throughput frame format signal (non-HT SIGNAL field, L-SIG) field. A signal carried by the L-STF field is used to indicate the signal receiving device to perform signal detection and AGC (automatic gain control) adjustment, the signal receiving device to perform time domain frequency offset estimation, and the signal receiving device and the signal transmitting device to perform coarse synchronization. A signal carried by the L-LTF field is used to indicate the signal receiving device to perform time domain fine offset estimation, the signal receiving device to perform fine synchronization, and the signal receiving device to perform channel estimation. A signal carried by the L-SIG field is used to indicate a signal transmission rate, a converted data length, and a parity check bit.

A Preamble field in the HTMF frame format includes: an L-STF field, an L-LTF field, an L-SIG field, a high throughput frame format signal (HT SIGNAL field, HT-SIG) field, a high throughput frame format short training sequence (HT Short Training field, HT-STF) field, and a high throughput frame format long training sequence (HT Long Training field, HT-LTF) field. Information indicated by a signal carried by the L-STF field, the L-LTF field, and the L-SIG field is the same as information indicated by a signal carried by a related field in the Non-HT frame format. A signal carried by the HT-SIG field is used to indicate necessary information for parsing the HTMF frame format, and the necessary information includes but is not limited to bandwidth information, MCS information, and the like. A signal carried by the HT-STF field is used to indicate AGC in a MIMO receiving process. A signal carried by the HT-LTF field is used to indicate MIMO signal estimation.

A Preamble field in the VHT frame format includes: an L-STF field, an L-LTF field, an L-SIG field, a very high throughput frame format signal A (VHT SIGNAL field A, VHT-SIGA) field, a very high throughput frame format short training sequence (VHT Short Training field, VHT-STF) field, a very high throughput frame format long training sequence (VHT Long Training field, VHT-LTF) field, and a very high throughput frame format signal B (VHT SIGNAL field B, VHT-SIGB) field. Information indicated by a signal carried by the L-STF field, the L-LTF field, and the L-SIG field is the same as the information indicated by the signal carried by the related field in the Non-HT frame format. A signal carried by the VHT-SIGA field is used to indicate necessary information for parsing the VHT frame format, and the necessary information includes but is not limited to bandwidth information, MCS information, and the like. A signal carried by the VHT-STF field is used to indicate AGC in a MIMO receiving process. A signal carried by the VHT-LTF field is used to indicate MIMO signal estimation. A signal carried by the VHT-SIGB field is used to indicate specific information of each user in an MU mode.

A Preamble field in the HE-SU/HE-ERSU/HE-TB frame format includes: a legacy short training sequence/non-high throughput frame format short training sequence (non-HT Short Training field, L-STF) field, a legacy long training sequence/non-high throughput frame format long training sequence (non-HT Long Training field, L-LTF) field, a legacy signal/non-high throughput frame format signal (non-HT SIGNAL field, L-SIG) field, a repeated legacy signal/repeated non-high throughput frame format field (Repeated non-HT SIGNAL field, RL-SIG) field, a high efficiency frame format signal A (HE SIGNAL field A, HE-SIGA) field, a high efficiency frame format short training sequence (HE Short Training field, HE-STF) field, and a high efficiency frame format long training sequence (HE Long Training field, HE-LTF) field. Information indicated by a signal carried by the L-STF field, the L-LTF field, and the L-SIG field is the same as the information indicated by the signal carried by the related field in the Non-HT frame format. A signal carried by the RL-SIG field is a duplicate of a signal carried by the L-SIG field, to distinguish whether the signal transmitting device uses the HE frame format for signal transmission. A signal carried by the HE-SIGA field is used to indicate necessary information for parsing the HE frame format. The necessary information includes but is not limited to: used frame format information, uplink and downlink information, information about a combination of a modulation scheme and a coding rate (Modulation coding scheme, MCS), and the like. A signal carried by the HE-STF field is used to indicate AGC in a MIMO receiving process, and a signal carried by the HE-LTF field is used to indicate MIMO signal estimation.

A Preamble field in the HE-MU frame format includes: an L-STF field, an L-LTF field, an L-SIG field, an RL-SIG field, an HE-SIGA field, a high efficiency frame format signal B (HE SIGNAL field B, HE-SIGB) field, an HE-STF field, and an HE-LTF field. Information indicated by a signal carried by the L-STF field, the L-LTF field, the L-SIG field, the RL-SIG field, the HE-SIGA field, the HE-STF field, and the HE-LTF field is the same as information indicated by a signal carried by a related field in the HE-SU frame format. A signal carried by the HE-SIGB field is used to indicate frequency domain resource allocation information of orthogonal frequency division multiple access (OFDMA) and multi-user multiple-input multiple-output (multi-user MIMO, DL-MU-MIMO).

In a first possible implementation, an interference signal and a signal carried by a Data field in an HE-SU/HE-ERSU/HE-TB frame format, an HE-ERMU frame format, a VHT frame format, an HTMF frame format, and a Non-HT frame format shown in FIG. 6 may be summed. In other words, when superimposing the wanted signal and the interference signal, the baseband processor keeps a signal carried by another field in the frame format unchanged, and when processing the signal carried by the Data field, the baseband processor may perform a sum operation on the signal carried by the Data field and the interference signal.

In a second possible implementation, in addition to the interference signal and a signal carried by a Data field in an HE-SU/HE-ERSU/HE-TB frame format, an HE-MU frame format, a VHT frame format, an HTMF frame format, and a Non-HT frame format shown in FIG. 6 being summed, the interference signal and a signal carried by an L-LTF field and a field following the L-LTF field in a preamble field in each frame format may be further summed, so that an eavesdropping device can be prevented from obtaining a correct channel estimation result. For example, for the HE-SU/HE-ERSU/HE-TB frame format, the interference signal and a signal carried by an L-LTF field, an L-SIG field, an RL-SIG field, an HE-SIGA field, an HE-STF field, and an HE-LTF field in a preamble field are summed. For the HEMU frame format, the interference signal and a signal carried by an L-LTF field, an L-SIG field, an RL-SIG field, an HE-SIGA field, an HE-SIGB field, an HE-STF field, and an HE-LTF field in a preamble field are summed. For the VHT frame format, the interference signal and a signal carried by an L-LTF field, an L-SIG field, a VHT-SIGA field, a VHT-STF field, a VHT-LTF field, and a VHT-SIGB field in a preamble field are summed. For the HTMF frame format, the interference signal and a signal carried by an L-LTF field, an L-SIG field, an HT-SIG field, an HT-STF field, and an HT-LTF field in a preamble field are summed. For the Non-HT frame format, the interference signal and a signal carried by an L-LTF field in a preamble field are summed.

In a third possible implementation, in addition to the interference signal and a signal carried by a Data field in an HE-SU/HE-ERSU/HE-TB frame format, an HE-MU frame format, a VHT frame format, an HTMF frame format, and a Non-HT frame format shown in FIG. 6 being summed, the interference signal and a signal carried by an RL-SIG field, an HE-SIGA/B field, a VHT-SIGA/B field, and an HT-SIG field in a preamble field in each frame format may be further summed, so that an eavesdropping device can be prevented from obtaining configuration information such as bandwidth and MCS.

In a fourth possible implementation, in addition to the interference signal and a signal carried by a Data field in an HE-SU/HE-ERSU/HE-TB frame format, an HEMU frame format, a VHT frame format, an HTMF frame format, and a Non-HT frame format shown in FIG. 6 being summed, the interference signal and a signal carried by an HE-LTF field, a VHT-LTF field, or an HT-LTF field in a preamble field in each frame format may be further summed, so that an eavesdropping device can be prevented from obtaining correct estimation of a MIMO channel.

In a fifth possible implementation, the interference signal and a signal carried by all fields of any frame format in used HE-SU/HE-ERSU/HE-TB frame format, HEMU frame format, VHT frame format, HTMF frame format, and Non-HT frame format may be summed. In this way, an interference capability can be enhanced, so that the eavesdropping device cannot synchronize a signal, estimate a frequency offset, perform AGC adjustment, or obtain information such as a correct data length, and the eavesdropping device can be prevented from restoring information of a Data field of a wanted signal.

Figure 7:
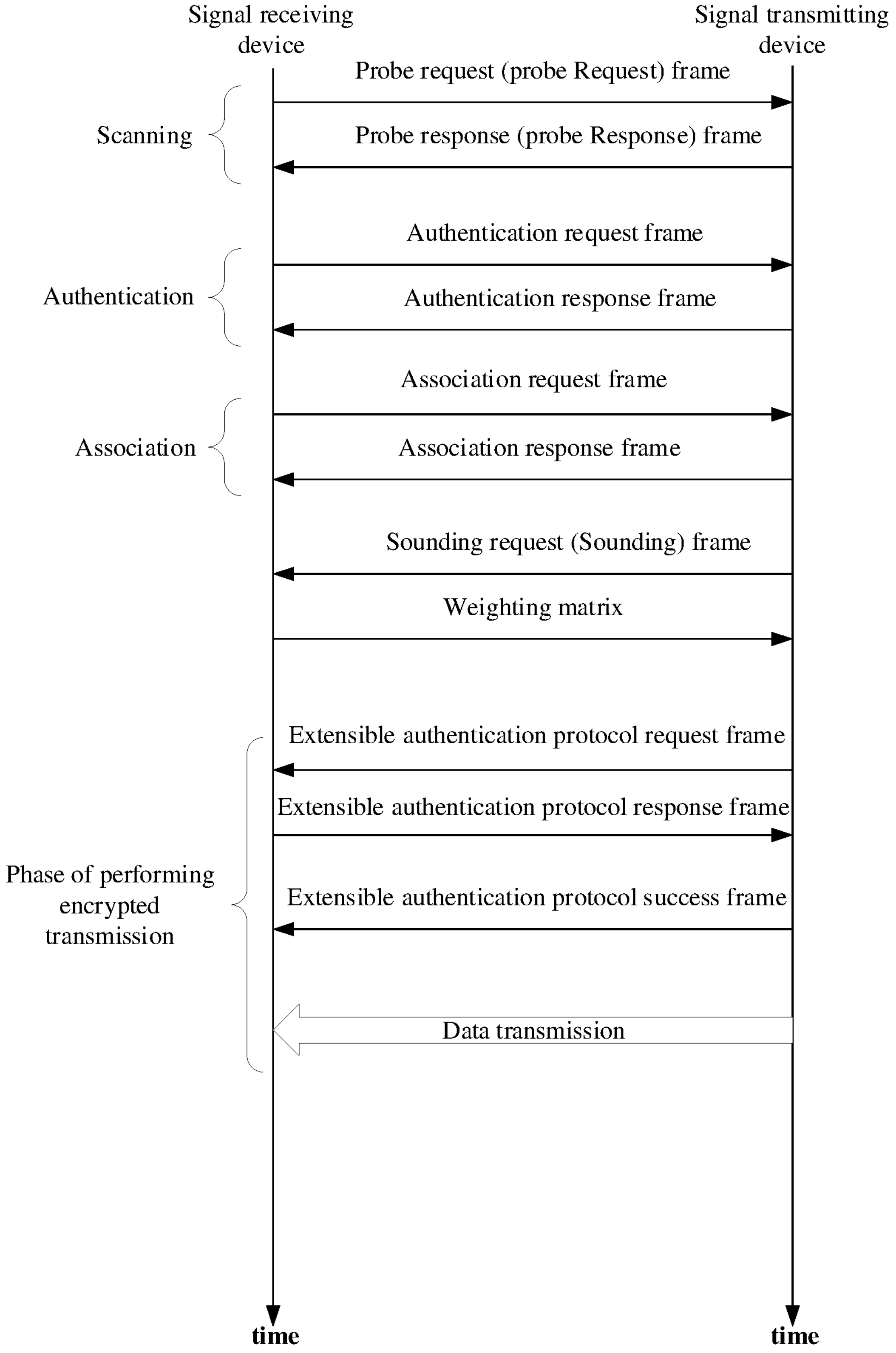
FIG. 7 is a sequence diagram of performing signal exchange between a terminal device and a network device based on a Wi-Fi protocol according to an embodiment of the present disclosure.

Based on a principle of encrypting a wanted signal in the embodiments shown in FIG. 3 to FIG. 5, and a content interfered with by an interference signal shown in FIG. 6, continue to refer to FIG. 7. FIG. 7 schematically shows an interaction time sequence between a terminal device and a network device based on a Wi-Fi protocol 802.1X. It should be noted that the interaction time sequence shown in FIG. 7 is an interaction time sequence between devices having a beamforming function. A network device is used as a signal transmitting device and a terminal device is used as a signal receiving device for description below.

Specifically, a process in which a connection is established between the network device and the terminal device, so that the network device transmits wanted data to the terminal device usually includes a scanning phase, an association phase, a sounding frame transmission phase, and the like shown in FIG. 7. Scanning phase: In this phase, the terminal device transmits a sounding request frame, and the network device scans the sounding request frame, and transmits a sounding response frame to the terminal device based on a scanning result. Authentication phase: In this phase, the terminal device transmits an authentication request frame to the network device, and the network device transmits an authentication response frame to the terminal device. Association phase: In this phase, the terminal device transmits an association request frame to the network device, and the network device transmits an association response frame to the terminal device based on the association request frame.

After the association phase, the network device may transmit a sounding frame to the terminal device, so that the terminal device estimates a channel. Then, the terminal device generates a spatial channel matrix based on a channel estimation result. Then, the terminal device performs singular value decomposition on the spatial channel matrix by using formula (3), generates a weighting matrix based on a singular value decomposition result, and sends the weighting matrix to the network device. In this case, the network device obtains the weighting matrix. The network device may generate an encoding matrix W orthogonal to the weighting matrix based on the weighting matrix, to process the interference information, so as to generate an interference signal. Then, when a signal is sent to the terminal device subsequently, the interference signal and a signal carried by some fields in one of the frame formats shown in FIG. 6 are summed based on a frame format used for sending the signal and content interfered with by the interference signal, so that a superimposed signal is sent to the terminal device. Specifically, still refer to FIG. 7. After the network device obtains the weighting matrix from the terminal device, a following information transmission phase is further included: transmitting an extensible authentication protocol (EAP) request to the terminal device, sending EAP authentication success information to the terminal device, and transmitting data to the terminal device. In this embodiment, in any information transmission phase in which the network device transmits an EAP request to the terminal device, sends an EAP authentication success information to the terminal device, and transmits data to the terminal device, a sent wanted signal may be encrypted by using the interference signal.

In a communication time sequence shown in FIG. 7, both the terminal device and the network device may be used as a signal transmitting device. In this scenario, the interference signal may be summed in both a signal transmitted by the terminal device and a signal transmitted by the network device. Based on this scenario, in this case, after the foregoing association phase, the terminal device may transmit a sounding frame to the network device, to trigger the network device to transmit the weighting matrix to the terminal device. In addition, after transmitting the weighting matrix to the terminal device, the network device may further transmit the sounding frame to the terminal device, to trigger the terminal device to transmit a weighting matrix to the network device. In this way, when a signal is transmitted by the network device to the terminal device subsequently, the interference information may always be processed based on the weighting matrix provided by the terminal device, and a processed interference signal is summed in a wanted signal to be transmitted; and when a signal is transmitted by the terminal device to the network device subsequently, the interference information may always be processed based on the weighting matrix provided by the network device, and the processed interference signal is summed in the wanted signal to be transmitted, to implement encryption of the signal transmitted by the network device to the terminal device and encryption of the signal transmitted by the terminal device to the network device.

Figure 8:
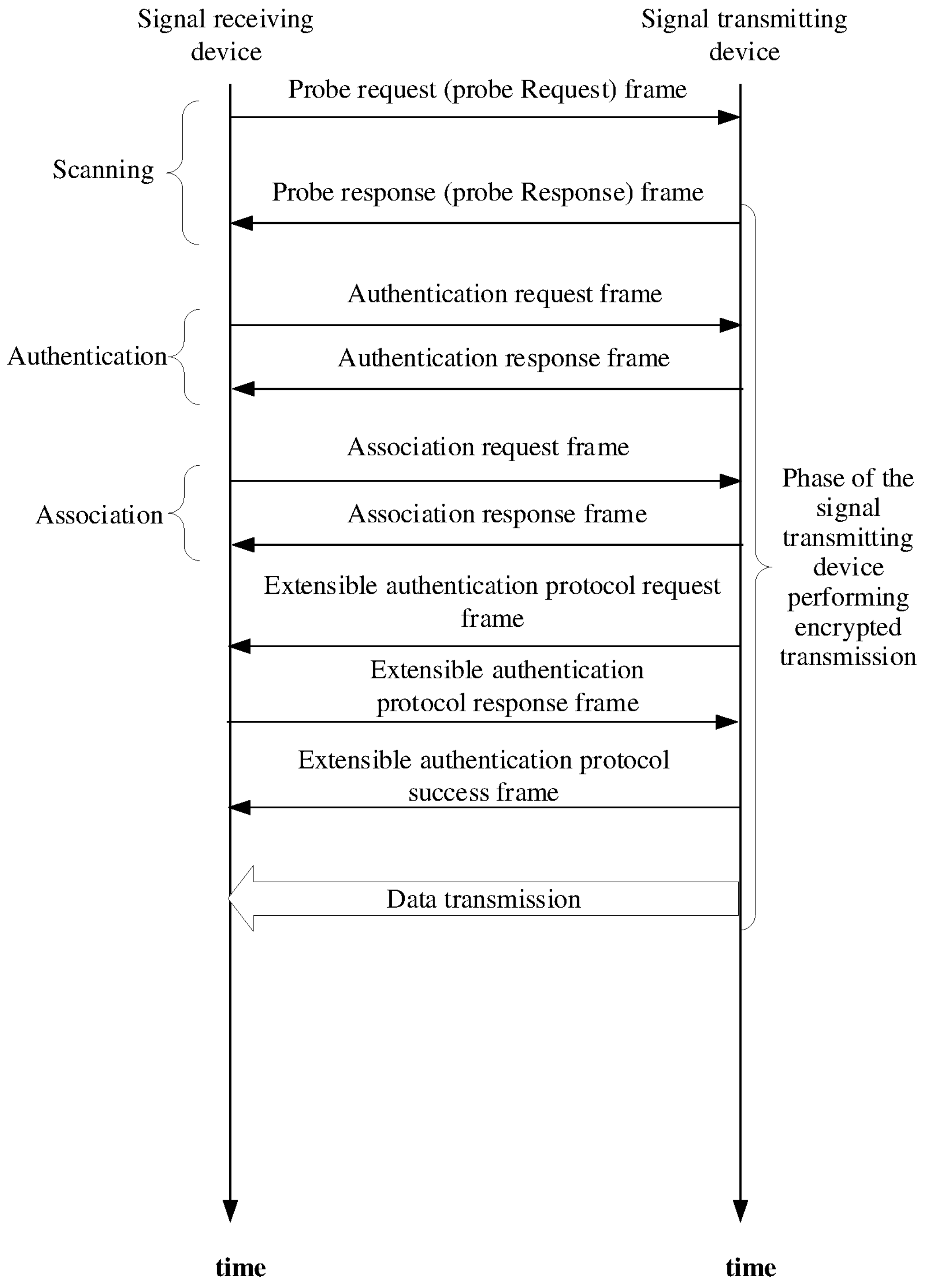
FIG. 8 is another sequence diagram of performing signal exchange between a terminal device and a network device based on a Wi-Fi protocol according to an embodiment of the present disclosure.

When the terminal device does not support the beamforming function, during communication between the terminal device and the network device, the terminal device may transmit a sounding request signal to the network device in a scanning phase. The network device obtains by parsing, a spatial channel matrix of a communication channel between the network device and the terminal device based on the sounding request signal by using the Legacy TxBF algorithm, and then decomposes the spatial channel matrix to obtain a weighting matrix. Then, the interference information is encoded based on the weighting matrix, and the interference signal is generated based on an encoding result. Therefore, the network device may superimpose the interference signal in a signal transmitted to the terminal device at any subsequent phase, as shown in FIG. 8.

It can be learned from the embodiments shown in FIG. 2 to FIG. 8 that, a communication apparatus 100 shown in this embodiment generates a weighting matrix based on channel estimation of a communication channel between the communication apparatus 100 and a signal receiving device, then determines an encoding matrix orthogonal to the weighting matrix by using the weighting matrix, encodes interference information by using the encoding matrix, superimposes an encoded interference signal and a to-be-sent signal and sends a superimposed signal to the signal receiving device. This can achieve an objective of encrypting the to-be-sent signal, to improve security of a to-be-sent wanted signal.

Figure 9:
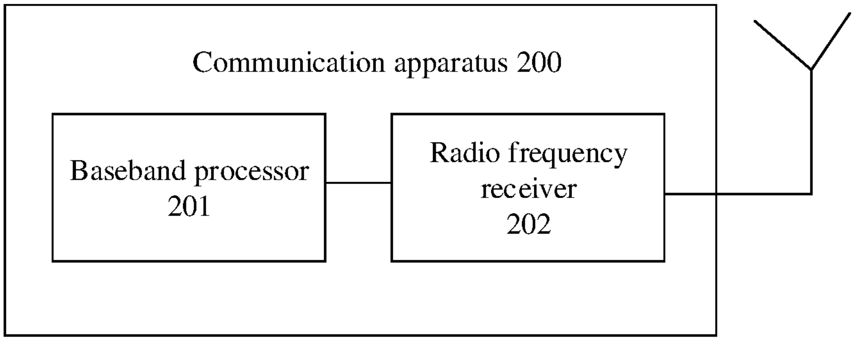
FIG. 9 is a schematic diagram of a hardware structure of another communication apparatus according to an embodiment of the present disclosure.
Figure 10:
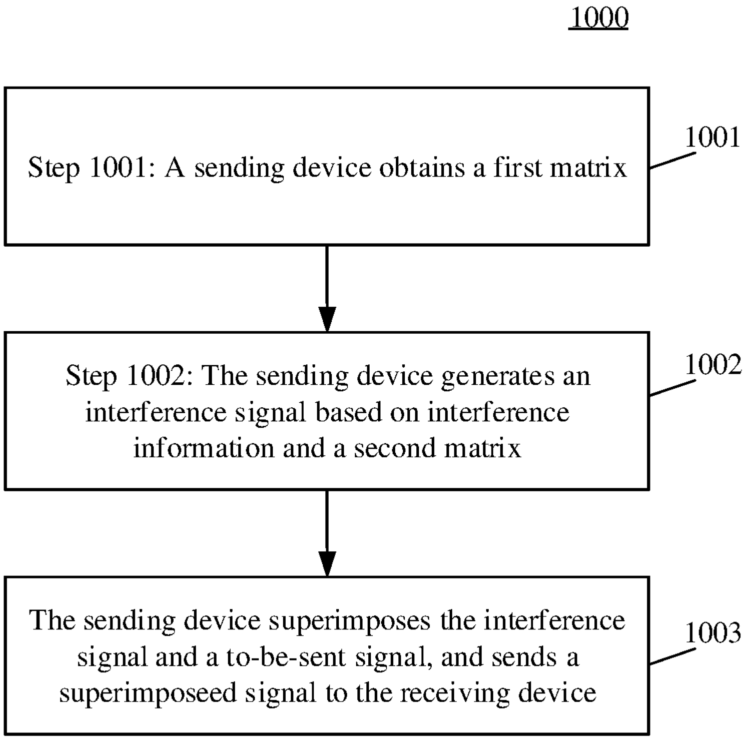
FIG. 10 is a flowchart of a wireless communication method according to an embodiment of the present disclosure.
Figure 11:
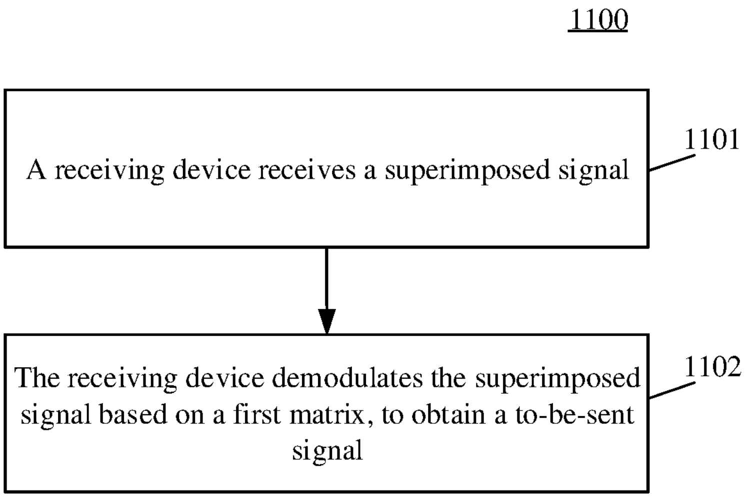
FIG. 11 is a flowchart of another wireless communication method according to an embodiment of the present disclosure.

FIG. 9 is a schematic diagram of a hardware structure of a communication apparatus 200 according to an embodiment of the present disclosure. The communication apparatus 200 described in this embodiment may be a communication apparatus in a short-range communication scenario such as Wi-Fi, or may be a communication apparatus in a cellular network communication scenario such as 3G, 4G, or 5G. The communication apparatus 100 may be specifically a chip, a chip set, a circuit board provided with a chip or a chip set, or an electronic device including the circuit board (for example, the terminal device or the network device described above). The chip or chip set or the circuit board provided with the chip or chip set may work under a necessary software driver. Subsequent embodiments are described by using an example in which the communication apparatus 200 is an electronic device, but are not intended to limit a solution. The communication apparatus 200 shown in FIG. 9 includes one or more processors, for example, a baseband processor 201 and another processor. The one or more processors may be integrated in one or more chips, and the one or more chips may be considered as one chip set. When the one or more processors are integrated in a same chip, the chip is also called a system on chip (SOC). In a possible implementation, the baseband processor 201 and a radio frequency receiver 202 may be integrated on a same chip, that is, integrated on an SOC. In addition, in another implementation, the baseband processor 201 may be integrated on a chip, and the radio frequency receiver 202 may be integrated on another chip. An electronic apparatus shown in FIG. 2 is applied to a signal receiving device.

In the communication apparatus 200 shown in FIG. 9, the radio frequency receiver 202 may receive a radio frequency signal by using an antenna, and the radio frequency signal may be a superimposed signal transmitted by the communication apparatus 100 shown in FIG. 2. The radio frequency receiver 202 may down-convert the received superimposed signal and then provide the superimposed signal to the baseband processor 201. The baseband processor 201 may demodulate the received superimposed signal by using the channel matrix or the weighting matrix in the embodiment shown in FIG. 2, to obtain a wanted signal. Specifically, for a principle of demodulating the superimposed signal by the communication apparatus 200, refer to related descriptions in the embodiment shown in FIG. 2.

It should be noted that the terminal device or the network device described in embodiments of the present disclosure may be used as a signal transmitting device, or may be used as a signal receiving device. Therefore, the communication apparatus 100 and the communication apparatus 200 may be integrated into a same electronic device, and are not only configured to generate a superimposed signal and transmit the superimposed signal, but also configured to receive a superimposed signal. When the communication apparatus 100 and the communication apparatus 200 are integrated into a same electronic device, the baseband processor 101 and the baseband processor 201 may perform encoding and decoding processing on a fundamental frequency signal for a same hardware component or chip, and the radio transmitter 102 and the radio frequency receiver 202 may transmit and receive a radio frequency signal for the same hardware component or chip.

Based on the foregoing communication apparatus 100 and an encryption principle of encrypting a wanted signal sent by the communication apparatus 100, an embodiment of the present disclosure further provides a wireless communication method. The wireless communication method is applied to a sending device that includes the communication apparatus 100 shown in FIG. 2. A procedure 1000 of the wireless communication method includes the following steps:

Step 1001: The sending device obtains a first matrix.

In this embodiment, the first matrix is generated based on channel estimation of a communication channel between the sending device and a signal receiving device.

In a possible implementation of this embodiment, the first matrix is generated based on a channel estimation result that is obtained performing channel estimation on a long training field in a received sounding response frame by the receiving device.

In another possible implementation of this embodiment, the first matrix is generated based on a channel estimation result that is obtained by estimating, by the sending device, a channel based on channel measurement information sent by the receiving device.

Step 1002: The sending device generates an interference signal based on interference information and a second matrix.

In this embodiment, the second matrix is an orthogonal matrix of the first matrix.

The second matrix may be obtained by solving an orthogonal matrix of the first matrix.

In another possible implementation of this embodiment, the first matrix is an orthogonal matrix, and the second matrix is a matrix constituted by at least one column of vectors selected from the first matrix.

Step 1003: The sending device superimposes the interference signal and a to-be-sent signal, and sends a superimposed signal to the receiving device.

In a possible implementation of this embodiment, that the sending device superimposes the interference signal and the to-be-sent signal includes: The sending device carries the interference signal and the to-be-sent signal in a data field in a frame format of a communication protocol.

In a possible implementation of this embodiment, when the sending device communicates with the receiving device based on a Wi-Fi communication technology, that the sending device superimposes the interference signal and the to-be-sent signal includes: The sending device carries the interference signal and the to-be-sent signal in a data field of a Wi-Fi frame format and at least one field of the following fields: a field indicating signal detection, a field indicating to perform automatic gain control (AGC), a field indicating signal synchronization, a field indicating signal frequency offset estimation, a field indicating a signal length, a field indicating to perform channel estimation, a field indicating a frame format used for detection, a field indicating that configuration information is carried by a frame format, a field indicating to perform automatic gain control in a multiple-input multiple-output (MIMO) receiving process, a field indicating to perform MIMO channel estimation, or a field indicating resource allocation information of orthogonal frequency division multiple access (OFDMA) and multi-user MIMO.

In a possible implementation of this embodiment, the to-be-sent signal is generated based on a mapping result of N subcarriers after the sending device performs mapping to the N subcarriers on information provided by a to-be-sent information source, where N is an integer greater than 1.

In a possible implementation, each of the N subcarriers corresponds to N channels between the sending device and the receiving device, the first matrix include N first matrices, each of the N first matrices is generated by performing channel estimation on each of the N channels, and the second matrix include N second matrices, where each second matrix is an orthogonal matrix of a corresponding first matrix.

In a possible implementation of this embodiment, that the sending device generates an interference signal based on interference information and a second matrix includes: The sending device performs the mapping to the N subcarriers on the interference information, to obtain signals after mapping to N subcarriers; and the sending device generates the interference signal based on the N second matrices and the signals after mapping to N subcarriers.

In a possible implementation of this embodiment, that the sending device superimposes the interference signal and the to-be-sent signal includes: The sending device separately superimposes the interference signal corresponding to each of the N subcarriers and the to-be-sent signal.

An embodiment of the present disclosure further provides a wireless communication method. The wireless communication method is applied to a receiving device that includes the communication apparatus 200 shown in FIG. 9. A procedure 1100 of the wireless communication method includes the following steps:

Step 1101: The receiving device receives a superimposed signal.

In this embodiment, the superimposed signal is a signal obtained by superimposing an interference signal and a to-be-sent signal, the interference signal is generated based on interference information and a second matrix, the second matrix is an orthogonal matrix of a first matrix, and the first matrix is generated based on channel estimation of a communication channel between the receiving device and a sending device.

Step 1102: The receiving device demodulates the superimposed signal based on the first matrix, to obtain the to-be-sent signal.

In this embodiment, the superimposed signal is processed, that is, the superimposed signal is multiplied by a spatial channel matrix. The interference signal in the superimposed signal may be canceled based on a product result, so that the to-be-sent signal can be obtained. The spatial channel matrix is a matrix for obtaining the first matrix through decomposition.

It may be understood that, to implement the foregoing functions, a communication apparatus includes corresponding hardware and/or software modules for performing each function. With reference to algorithm steps of each example described in embodiments disclosed in this specification, the present disclosure can be implemented in a form of hardware or a combination of hardware and computer software. Whether a certain function is performed in a manner of hardware or hardware driven by computer software depends on a particular application and a design constraint of the technical solutions. A person skilled in the art may use different methods to implement a described function for each particular application with reference to embodiments, but it should not be considered that the implementation goes beyond the scope of the present disclosure.

In this embodiment, the baseband processor and the radio transmitter may be performed function module division based on the foregoing method examples. For example, each function module may be obtained through division based on each corresponding function, or two or more functions may be integrated into one processing module. The integrated module may be implemented in a form of hardware. It should be noted that, in this embodiment, division on the modules is an example, and is merely logical function division. During actual implementation, another division manner may be used.

Figure 12:
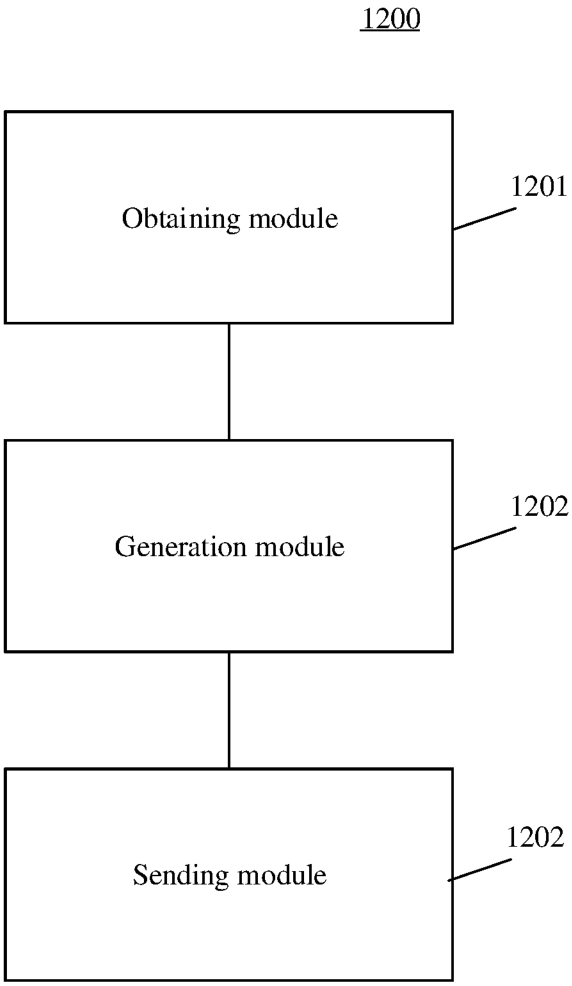
FIG. 12 is a schematic diagram of a structure of a transmitting apparatus according to an embodiment of the present disclosure.

When each function module is obtained through division based on each corresponding function, FIG. 12 is a schematic diagram of a possible composition of a communication apparatus 1200 in the foregoing embodiment. As shown in FIG. 12, the communication apparatus 1200 may include an obtaining module 1201, a generation module 1202, and a sending module 1203. The obtaining module 1201 is configured to obtain a first matrix, where the first matrix is generated based on channel estimation of a communication channel between a communication apparatus and a signal receiving device. The generation module 1202 is configured to generate an interference signal based on interference information and a second matrix, where the second matrix is an orthogonal matrix of the first matrix. The sending module 1203 is configured to superimpose the interference signal and a to-be-send signal, and send a superimposed signal to the receiving device.

Figure 13:
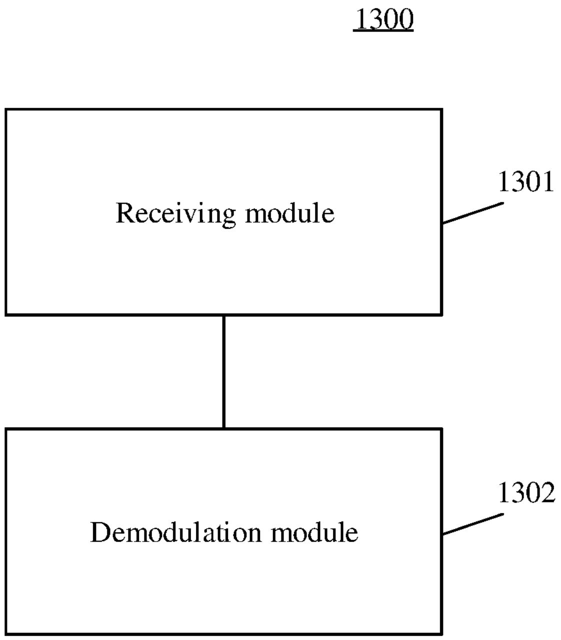
FIG. 13 is a schematic diagram of a structure of a receiving apparatus according to an embodiment of the present disclosure.

When each function module is obtained through division based on each corresponding function, FIG. 13 is a schematic diagram of a possible composition of a communication apparatus 1300 in the foregoing embodiment. As shown in FIG. 13, the communication apparatus 1300 may include a receiving module 1301 and a demodulation module 1302. The receiving module 1301 is configured to receive a superimposed signal. The superimposed signal is a signal obtained by superimposing an interference signal and a to-be-sent signal, the interference signal is generated based on interference information and a second matrix, the second matrix is an orthogonal matrix of a first matrix, and the first matrix is generated based on channel estimation of a communication channel between the communication apparatus and a sending device. The demodulation module 1302: The receiving device demodulates the superimposed signal based on the first matrix, to obtain the to-be-sent signal.

The communication apparatus 1200 and the communication apparatus 1300 provided in this embodiment are respectively configured to perform a wireless communication method performed by the communication apparatus 100 and a wireless communication method performed by the communication apparatus 200, and can achieve a same effect as the foregoing implementation method. The modules corresponding to FIG. 12 and FIG. 13 may be implemented by software, hardware, or a combination thereof. For example, each module may be implemented in a form of software. The communication apparatus 1200 in FIG. 12 corresponds to the baseband processor and the radio transmitter that correspond to the module in FIG. 2, and is configured to drive a corresponding component to work. The communication apparatus 1300 in FIG. 13 corresponds to the baseband processor and the radio frequency receiver that correspond to the module in FIG. 9, or, each module may include two parts: a corresponding component and corresponding driver software.

When an integrated unit is used, the communication apparatus 1200 may include a baseband processor, a radio transmitter, and a memory. The communication apparatus 1300 may include a baseband processor, a radio frequency receiver, and a memory. The baseband processor, the radio transmitter, and the radio frequency receiver may invoke all or some computer programs stored in the memory, to control and manage actions of the communication apparatus 100 and the communication apparatus 200, for example, may be configured to support the communication apparatus 100 and the communication apparatus 200 in performing the steps performed by the foregoing modules. The memory may be configured to support the communication apparatus 100 and the communication apparatus 200 in storing program code, data, and the like. The baseband processor and the transmitter may implement or execute various example logical modules described with reference to content disclosed in the present disclosure, and may be a combination of one or more microprocessors that implement a computing function. In addition, in addition to the components shown in FIG. 2, the processor may further include another component such as a modem.

This embodiment further provides a computer-readable storage medium. The computer-readable storage medium stores computer instructions. When the computer instructions are run on a computer, the computer is enabled to perform the foregoing related method steps to implement a wireless communication method of the communication apparatus 1200 and the communication apparatus 1300 in the foregoing embodiments.

This embodiment further provides a computer program product. When the computer program product runs on a computer, the computer is enabled to perform the foregoing related steps to implement the wireless communication method of the communication apparatus 1200 and the communication apparatus 1300 in the foregoing embodiments.

The computer-readable storage medium or the computer program product provided in this embodiment is both configured to perform a corresponding method provided above. Therefore, for beneficial effects that can be achieved by the computer-readable storage medium or the computer program product, refer to the beneficial effects in a corresponding method provided above.

Based on the descriptions of the foregoing implementations, a person skilled in the art may understand that for the purpose of convenient and brief descriptions, division into the foregoing function modules is merely used as an example for description. In actual application, the foregoing functions can be allocated to different function modules for implementation based on a requirement, that is, an inner structure of an apparatus is divided into different function modules to implement all or some of the functions described above.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and is sold or used as an independent product, the integrated unit may be stored in a readable storage medium. Based on such an understanding, the technical solutions of the present disclosure essentially, or a part contributing to the conventional technology, or all or some of the technical solutions may be implemented in the form of a software product. The software product is stored in a storage medium and includes several instructions for allowing a device (which may be a single-chip microcomputer, a chip or the like) or a processor to perform all or some of the steps of the methods described in the embodiments of the present disclosure. The foregoing readable storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless communication method, comprising:

obtaining, by a sending device, one or more first matrices, wherein each of the one or more first matrices is generated based on channel estimation of a communication channel between the sending device and a signal receiving device;

generating, by the sending device, an interference signal based on a product of interference information and one or more second matrices, wherein each of the one or more second matrices is an orthogonal matrix of one of the one or more first matrices;

superimposing, by the sending device, the interference signal and a modulated to-be-sent signal to generate a superimposed signal; and sending, by the sending device, the superimposed signal to the signal receiving device, wherein the superimposing, by the sending device, the interference signal and a modulated to-be-sent signal comprises:

performing, by the sending device, a sum operation on (i) the interference signal and (ii) the modulated to-be-sent signal mapped to a data field of a frame format of a communication protocol, to generate the superimposed signal that is carried in the data field, wherein the sum operation is performed by a baseband processor of the sending device for each of a plurality of subcarriers by summing an interference signal corresponding to a respective subcarrier and a modulated to-be-sent signal corresponding to the respective subcarrier, to obtain a plurality of subcarrier signals after superposition, and wherein the plurality of subcarrier signals after superposition are subjected to parallel-to-serial conversion.

2. The method according to claim 1, wherein the sending device communicates with the signal receiving device based on a Wi-Fi communication technology, and the superimposing, by the sending device, the interference signal and a modulated to-be-sent signal comprises:

carrying, by the sending device, the interference signal and the modulated to-be-sent signal in the data field in a Wi-Fi frame format and at least one of the following fields:

a field indicating signal detection, a field indicating to perform automatic gain control (AGC), a field indicating signal synchronization, a field indicating signal frequency offset estimation, a field indicating a signal length, a field indicating to perform channel estimation, a field indicating a frame format used for detection, a field indicating that configuration information is carried by a frame format, a field indicating to perform automatic gain control in a multiple-input multiple-output (MIMO) receiving process, a field indicating to perform MIMO channel estimation, or a field indicating resource allocation information of orthogonal frequency division multiple access (OFDMA) and multi-user MIMO.

3. The method according to claim 1, wherein each of the one or more first matrices is an orthogonal matrix, and each of the one or more second matrices is a matrix constituted by at least one column of vectors selected from one of the one or more first matrices.

4. The method according to claim 1, wherein the to-be-sent signal is generated by the sending device from information provided by a to-be-sent information source, by mapping the information onto N subcarriers, and generating the to-be-sent signal based on a mapping result of the N subcarriers, wherein N is an integer greater than 1.

5. The method according to claim 4, wherein the N subcarriers respectively correspond to N channels between the sending device and the signal receiving device, the one or more first matrices comprise N first matrices, and each of the N first matrices is generated by performing channel estimation on each of the N channels by the sending device; and the one or more second matrices comprise N second matrices, and each of the N second matrices is an orthogonal matrix of a corresponding first matrix.

6. The method according to claim 5, wherein the generating, by the sending device, an interference signal based on interference information and one or more second matrices comprises:

mapping, by the sending device, the interference information onto the N subcarriers to obtain N mapped signals; and generating, by the sending device, N interference signals corresponding to the N subcarriers based on the N second matrices and the N mapped signals.

7. The method according to claim 6, wherein the N subcarriers onto which the interference information is mapped are the same as the carriers onto which the information provided by the to-be-sent information source is mapped.

8. The method according to claim 1, wherein each of the one or more first matrices is generated based on a channel estimation result that is obtained by performing channel estimation on a long training field in a received sounding response frame by the signal receiving device.

9. The method according to claim 1, wherein each of the one or more first matrices is generated based on a channel estimation result that is obtained by estimating, by the sending device, a channel based on channel measurement information sent by the signal receiving device.

10. The method according to claim 1, wherein each of the one or more first matrices is derivable from a spatial channel mapping matrix that is representable as a product of at least a unitary matrix, a diagonal matrix, and a weighting matrix, wherein the weighting matrix is the respective first matrix, an encoding matrix is selected such that a product of the encoding matrix and the weighting matrix is zero, and the encoding matrix is a second matrix that is an orthogonal matrix of the respective first matrix.

11. A wireless communication method, comprising:

receiving, by a receiving device, a superimposed signal, wherein the superimposed signal is generated by performing a sum operation on (i) an interference signal and (ii) a modulated to-be-sent signal mapped to a data field of a frame format of a communication protocol, the interference signal is generated based on a product of interference information and one or more second matrices, each of the one or more second matrices is an orthogonal matrix of a first matrix in one or more first matrices, and the first matrix is generated based on channel estimation of a communication channel between the receiving device and a sending device; and demodulating, by the receiving device, the superimposed signal based on the one or more first matrices, to obtain the to-be-sent signal, wherein the superimposed signal is carried in the data field, wherein the sum operation is performed by a baseband processor of the sending device for each of a plurality of carriers by summing an interference signal corresponding to a respective subcarrier and a modulated to-be-sent signal corresponding to the respective subcarrier, to obtain a plurality of subcarrier signals after superposition, and wherein the plurality of subcarrier signals after superposition are subjected to parallel-to-serial conversion.

12. A communication apparatus, comprising:

at least one processor, configured to: obtain one or more first matrices, generate an interference signal based on a product of interference information and one or more second matrices, and superimpose the interference signal and a modulated to-be-sent signal to obtain a superimposed signal, wherein each of the one or more second matrices is an orthogonal matrix of one of the one or more first matrices, and each of the one or more first matrices is generated based on channel estimation of a communication channel between the communication apparatus and a receiving device; and a radio transmitter, coupled to the at least one processor, and configured to send the superimposed signal to the receiving device, wherein the superimposing of the interference signal and the modulated to-be-sent signal comprises:

performing a sum operation on (i) the interference signal and (ii) the modulated to-be-sent signal mapped to a data field of a frame format of a communication protocol, to obtain the superimposed signal carried in the data field, wherein the sum operation is performed by the at least one processor of the communication apparatus for each of a plurality of subcarriers by summing an interference signal corresponding to a respective subcarrier and a modulated to-be-sent signal corresponding to the respective subcarrier, to obtain a plurality of subcarrier signals after superposition, and wherein the plurality of subcarrier signals after superposition are subjected to parallel-to-serial conversion.

13. The communication apparatus according to claim 12, wherein when the communication apparatus communicates with the receiving device based on a Wi-Fi communication technology, the at least one processor is further configured to:

carry the interference signal and the modulated to-be-sent signal in the data field in a Wi-Fi frame format and at least one of the following fields:

a field indicating signal detection, a field indicating to perform automatic gain control (AGC), a field indicating signal synchronization, a field indicating signal frequency offset estimation, a field indicating a signal length, a field indicating to perform channel estimation, a field indicating a frame format used for detection, a field indicating that configuration information is carried by a frame format, a field indicating to perform automatic gain control in a multiple-input multiple output (MIMO) receiving process, a field indicating to perform MIMO channel estimation, or a field indicating resource allocation information of orthogonal frequency division multiple access (OFDMA) and multi-user MIMO.

14. The communication apparatus according to claim 12, wherein the modulated to-be-sent signal is generated based on a mapping result of N subcarriers that is obtained by performing mapping to the N subcarriers on information provided by a to-be-sent information source, wherein N is an integer greater than 1.

15. The communication apparatus according to claim 14, wherein the N subcarriers respectively correspond to N channels between the communication apparatus and the receiving device, the one or more first matrices comprise N first matrices, and each of the N first matrices is generated by performing channel estimation on each of the N channels; and the one or more second matrices comprise N second matrices, and each of the N second matrices is an orthogonal matrix of a corresponding first matrix.

16. The communication apparatus according to claim 15, wherein the interference signal comprises N interference signals corresponding to the N subcarriers, and the N interference signals are generated based on the N second matrices and signals obtained by performing the mapping to the N subcarriers on the interference information.

17. The communication apparatus according to claim 16, wherein the N subcarriers onto which the interference information is mapped are the same as the N subcarriers onto which the information provided by the to-be-sent information source is mapped.

* * * * *